United States Patent [19]
Lynch et al.

[11] Patent Number: 5,583,771
[45] Date of Patent: Dec. 10, 1996

[54] METHOD AND APPARATUS FOR DISTINGUISHING BETWEEN DEPLOYMENT EVENTS AND NON-DEPLOYMENT EVENTS IN AN SIR SYSTEM

[75] Inventors: David D. Lynch, Santa Barbara; James F. Long; Rex P. Brumbach, Jr., both of Goleta; Porfirio Garcia, Jr., Santa Ynez, all of Calif.; Stephen J. Kiselewich, Carmel; Douglas D. Turner, Kokomo, both of Ind.

[73] Assignee: Delco Electronics Corp., Kokomo, Ind.

[21] Appl. No.: 285,673

[22] Filed: Aug. 4, 1994

[51] Int. Cl.⁶ ................................ B60R 21/32
[52] U.S. Cl. ................ 364/424.045; 395/21; 395/905; 180/282; 280/734; 307/10.1; 364/424.055
[58] Field of Search ................ 364/424.05, 148, 364/149, 150, 151; 395/20, 21, 23, 905; 180/271, 282; 280/734, 735, 728.1; 307/10.1

[56] References Cited

U.S. PATENT DOCUMENTS

| | | | |
|---|---|---|---|
| 3,211,832 | 10/1965 | Putzrath | 179/1 |
| 4,497,025 | 1/1985 | Hannover | 364/424 |
| 4,694,687 | 9/1987 | Bonin et al. | 73/116 |
| 4,875,183 | 10/1989 | Graf et al. | 364/807 |
| 4,947,482 | 8/1990 | Brown | 364/807 |
| 4,979,126 | 12/1990 | Pao et al. | 364/513 |
| 4,991,682 | 2/1991 | Kunta et al. | 180/282 |
| 5,010,512 | 4/1991 | Hartstein et al. | 364/807 |
| 5,014,810 | 5/1991 | Mattes et al. | 180/268 |
| 5,041,976 | 8/1991 | Marko et al. | 364/424.03 |
| 5,047,655 | 9/1991 | Chambost et al. | 307/201 |
| 5,063,601 | 11/1991 | Hayduk | 382/14 |
| 5,073,867 | 12/1991 | Murphy et al. | 395/27 |
| 5,075,871 | 12/1991 | Weidman | 395/24 |
| 5,086,479 | 2/1992 | Takenaga et al. | 382/14 |
| 5,091,864 | 2/1992 | Baji et al. | 395/27 |
| 5,113,483 | 5/1992 | Keller et al. | 395/23 |
| 5,173,614 | 12/1992 | Woehrl | 307/10.1 |
| 5,229,943 | 7/1993 | Eigler et al. | 364/424.05 |
| 5,282,134 | 1/1994 | Gioutsos et al. | 364/424.05 |
| 5,319,738 | 6/1994 | Shima et al. | 395/23 X |
| 5,377,108 | 12/1994 | Nishio | 364/424.05 |

FOREIGN PATENT DOCUMENTS

0568017A2  4/1993  European Pat. Off. .

OTHER PUBLICATIONS

Donald L. Wenskay, "Intellectual Property Protection for Neural Networks," Neural Networks, vol. 3, pp. 229–236, 1990.

*Primary Examiner*—Collin W. Park
*Attorney, Agent, or Firm*—Mark A. Navarre

[57] ABSTRACT

A pattern recognition system is utilized in a supplementary inflatable restraint (SIR) system to distinguish between deployment and non-deployment events. The pattern recognition system preferably includes dedicated hardware or a microprocessor programmed to perform a neural network simulation utilizing crash data in the form of vehicle acceleration data. Training and trial vectors are generated from the data to train and, subsequently, test the neural network.

20 Claims, 8 Drawing Sheets

METHOD AND APPARATUS FOR DISTINGUISHING BETWEEN DEPLOYMENT EVENTS AND NON-DEPLOYMENT EVENTS IN AN SIR SYSTEM

TECHNICAL FIELD

This invention relates to methods and apparatus for distinguishing between deployment events and non-deployment events in an SIR system and, in particular, to such methods and system which utilize a pattern recognition system.

BACKGROUND ART

Figure 1:
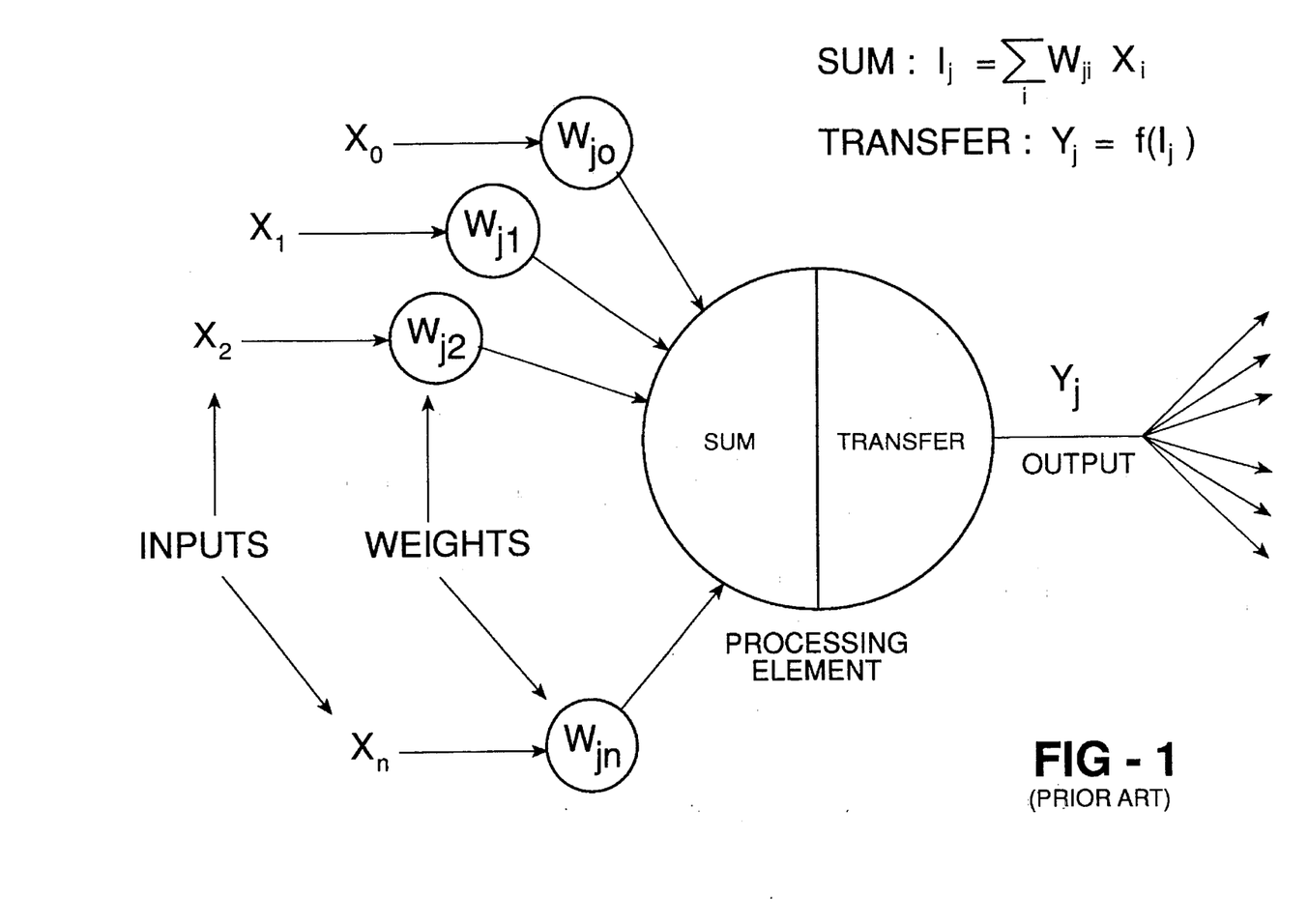
FIG. 1 is a schematic flow diagram of a typical processing element of a neural network.

Neural network technology represents an attempt to model the processing mechanism of the human brain. Basically, a neural network consists of a large number of very simple processors (called processing elements, or PEs) connected together in a complex manner. Each processing element generally has a number of inputs, each of which has a weight associated with it. The PE computes a sum of its weighted inputs, and this sum is applied to a transfer (or "activation") function as illustrated in FIG. 1.

The output of this transfer function is then passed along to other PEs in the network. Weights are typically signed real numbers, and the transfer function is often a sigmoid function, although others can be used.

Figure 2:
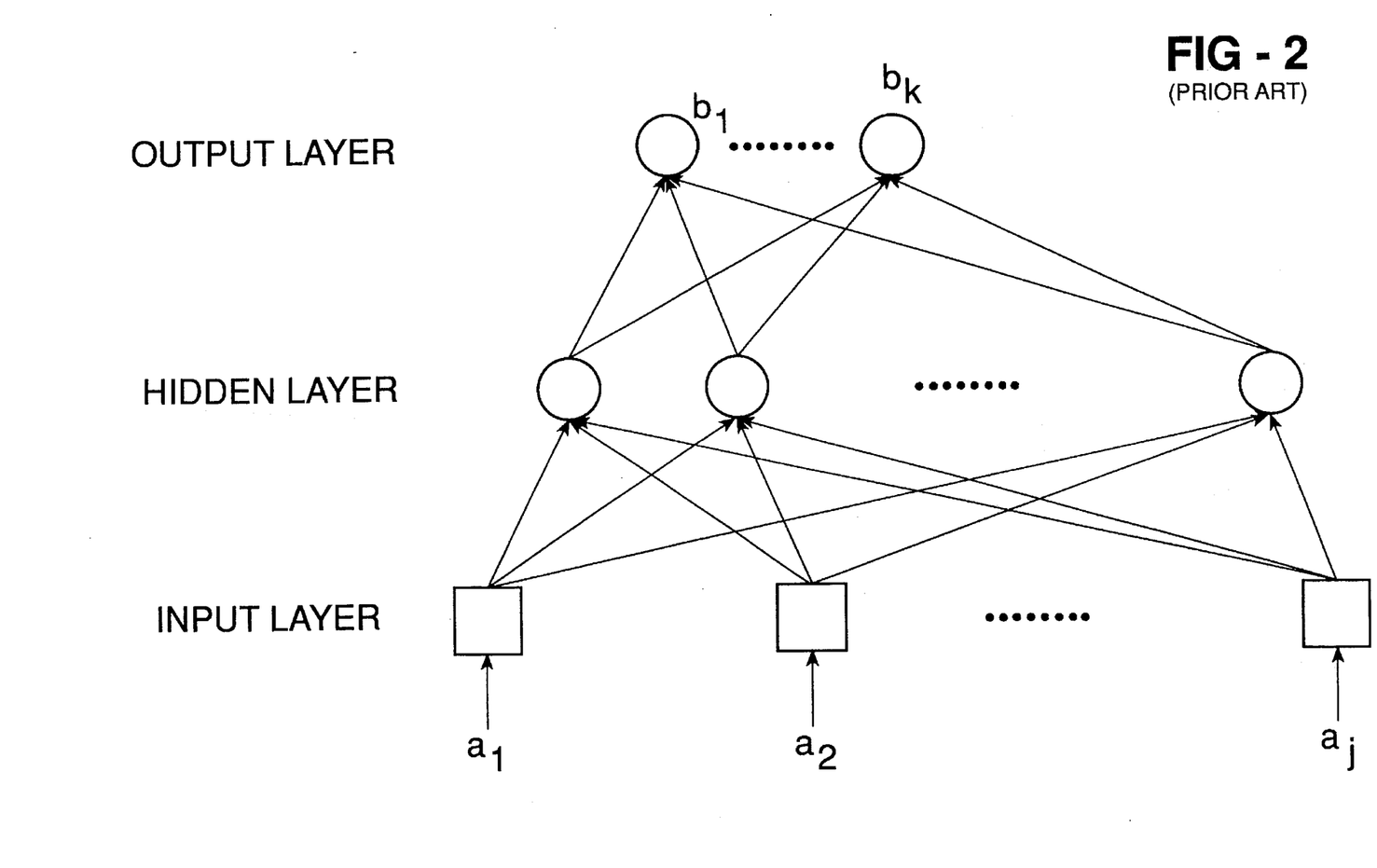
FIG. 2 is a schematic flow diagram of a multi-layered neural network.

By appropriately defining the interconnections between many PEs, a multi-layered neural network can be created as illustrated in FIG. 2. The network shown in FIG. 2 is called a "three-layer, fully-interconnected, feed-forward network" because there are three distinct layers, each PE is connected to every PE in the next layer, and no PE is connected to any PE in the same or preceding layers. No calculations are performed by the elements in the input layer; this layer serves only to distribute the input values to all of the PEs in the next layer. The middle layer is referred to as a "hidden layer" because the PEs in this layer do not interface with the outside environment. Many other types of network architectures are possible, but this is one of the most common.

When the network is learning, the weights associated with the interconnections are changed until the network produces the desired outputs. There exists a variety of different learning algorithms, but the most widely used is one called "back-propagation." In the back-propagation algorithm, a training pair (consisting of a vector of input values together with a vector of desired output values) is selected, and the input vector is applied to the network's input layer. This input vector is propagated forward through the network (with the output of each PE being calculated in the manner described above) until the vector of the network's output layer is obtained. The error between the actual output vector and the desired output vector is then propagated backward through the network, and the weights are adjusted in a specific way so as to reduce the error. This process is repeated until the error for all training pairs is acceptably small.

Neural networks have a number of desirable properties:

A neural network "learns" by being shown examples, not by being programmed. There is little need for traditional algorithm development and computer programming effort. System development time may therefore be reduced. Several processing steps can often be performed by one multi-layered neural network or, in some cases, eliminated completely. System complexity may therefore be reduced.

Neural network computation is massively parallel in nature, and a neural network can be implemented directly in hardware. System response time may therefore by improved.

A neural network's performance degrades gracefully as network components malfunction. System fault tolerance may therefore be improved.

A neural network has an ability to "generalize", which enables it to produce a reasonable output when presented with incomplete, noisy, or previously unseen inputs. System robustness may therefore be increased.

The U.S. Pat. No. 5,093,792, to Taki et al, discloses an apparatus for predicting and discriminating whether or not misfire will occur from the cylinder pressure before the occurrence of the misfire, by the use of a three layered neural network. The cylinder pressure signal detected by a cylinder pressure sensor is sampled and input to each of the elements of the input layer. The signal then is modulated corresponding to the strength (weight) of the connection between each of the elements, and transmitted to the hidden and output layers. The magnitude of signal from the elements of the output layer represents prediction and discrimination results. The weight is learned and determined by a back propagation method.

The U.S. Pat. No. 5,041,976, to Marko et al, discloses a diagnostic system which uses pattern recognition, such as a neural network, for electronic automotive control systems.

The U.S. Pat. No. 5,022,898, to Yuhara et al, discloses a method of controlling a motor vehicle having an engine, with a neural network which has a learning capability. An operation condition of the motor vehicle is controlled based on a predicted value of a throttle valve opening, which is represented by a periodically produced output signal from the neural network.

Figure 3:
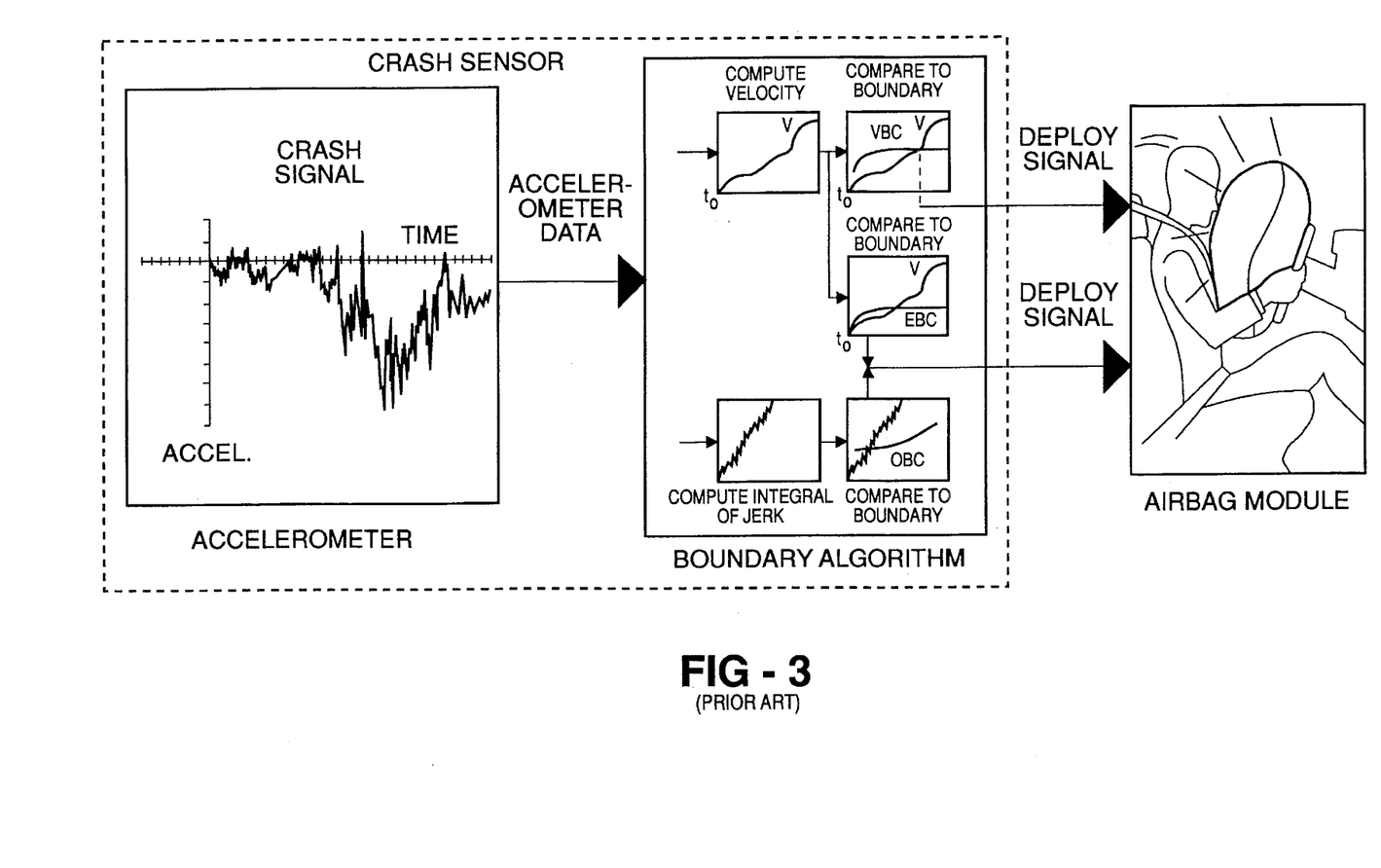
FIG. 3 is a schematic view of a current SIR system.

Supplemental Inflatable Restraint (SIR) systems are widely used in motor vehicles. Controllers for use in such SIR systems should be robust and immune to unwanted deployment. A velocity boundary curve (VBC) algorithm used in an electronic crash sensor is disclosed in U.S. patent application Ser. No. 07/798,487, filed Nov. 26, 1991, now abandoned, assigned to General Motors Corporation and incorporated herein by reference. The sensor disclosed therein utilizes acceleration signals measured by a micro-machined accelerometer located in the controller that is mounted in the vehicle passenger compartment as illustrated in FIG. 3. In order to achieve timely discrimination, the VBC utilizes four threshold curves digitized and stored in calibration lookup tables. The acceleration signal is digitized, then transformed into forms of jerk, acceleration, and velocity that are compared to four boundary curves that represent thresholds for absolute integral of jerk, partial energy, occupant-to-vehicle relative velocity, and a reset velocity parameter. These four thresholds are values that are based on the deployment and non-deployment crashes, rough road signals, and abuse signals used for calibration.

SUMMARY OF THE INVENTION

An object of the present invention is to provide a method and apparatus for distinguishing between deployment and non-deployment events in an SIR system which do not use predefined threshold curves stored in tables.

Another object of the present invention is to provide a method and apparatus which utilizes a pattern recognition system such as a neural network to determine what features of a signal should be used to discriminate deployment from non-deployment events. As a consequence, the resulting SIR system is significantly more robust than prior art SIR systems.

In carrying out the above objects and other objects of the present invention, a method is provided for distinguishing between deployment and non-deployment events from crash signals containing crash data in an SIR system for a motor vehicle. The method includes the step of generating pairs of training vectors from the crash data. Each pair of training vectors includes a vector having input values and a vector having a known output value associated with either a deployment event or a non-deployment event. The method also includes the steps of inputting the pairs of training vectors to a trainable pattern recognition system, and recursively adjusting the pattern recognition system to converge to a configuration of the pattern recognition system to obtain a trained pattern recognition system for matching an input vector with either a deployment event or a non-deployment event. The method further includes the step of generating at least one trial input vector from the crash data. The at least one trial input vector corresponds to either a deployment event or a non-deployment event. Finally, the method includes the step of inputting the at least one trial input vector to the trained pattern recognition system to generate an output signal representation of one of the events corresponding to the input vector.

Further in carrying out the above objects and other objects of the present invention, an apparatus is provided for carrying out the above method steps.

The above objects and other objects, features, and advantages of the present invention are readily apparent from the following detailed description of the best mode for carrying out the invention when taken in connection with the accompanying drawings.

DETAILED DESCRIPTION OF THE BEST MODE

Figure 4:
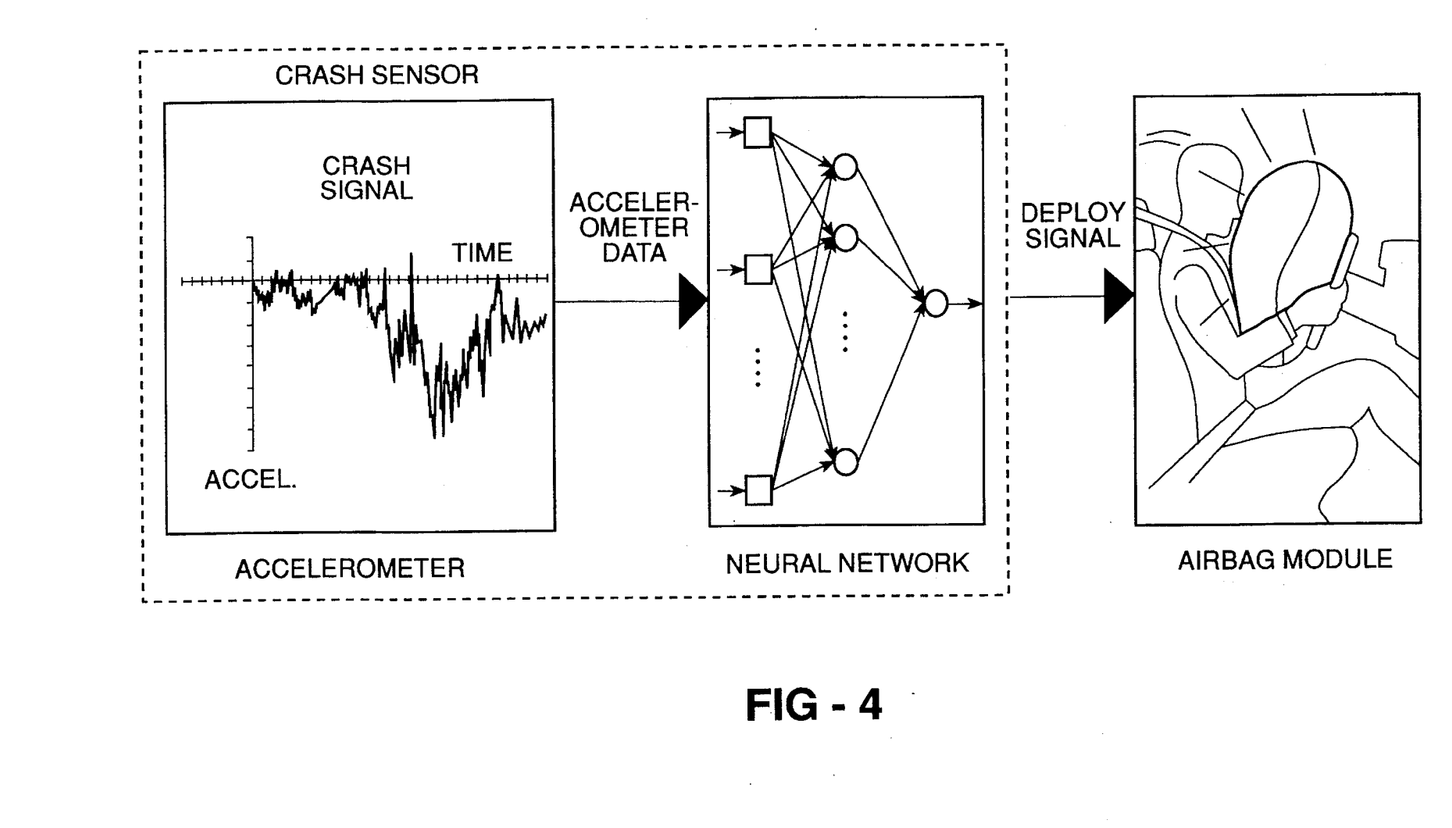
FIG. 4 is a schematic view of an SIR system utilizing a pattern recognition system such as a neural network constructed in accordance with the present invention.

Referring now to FIG. 4, there is illustrated an SIR system or crash sensor utilizing a pattern recognition system such as a neural network constructed in accordance with the present invention.

The neural network is preferably implemented with a programmed microprocessor or microcontroller for overall control of the SIR system. The microprocessor runs off a crystal oscillator. The microprocessor has various types of memory such as RAM and ROM for program and data storage and some type of mechanism to control program execution and data processing.

Preferably, the microprocessor has a built-in A/D converter to read in the filtered acceleration signal as described below.

The acceleration signal may be preprocessed before being applied as an input to the neural network. The preprocessing would convert the acceleration signal into one of its derivatives, for example velocity, displacement, oscillation or jerk.

In general, the microprocessor is also responsible for computing the neural network output from the data presented to its input layer. Details of the neural network software operation is disclosed hereinbelow. The neural network may be computed one neurode at a time, or if the architecture of the hardware supports it, multiple neurodes may be computed at the same time, i.e., in a parallel processing format.

Organizing Crash Data Into Training And Test Data Sets

There is described herein a way to organize acceleration or crash signals contained in data sets into neural network training and test data sets. A training set is a collection of training pairs, where each training pair consists of a vector of input values together with a vector of desired output values. A test set (which is used to test the performance of a network during and after training) is made up of similar pairs of input vectors and desired output vectors.

Figure 5A:
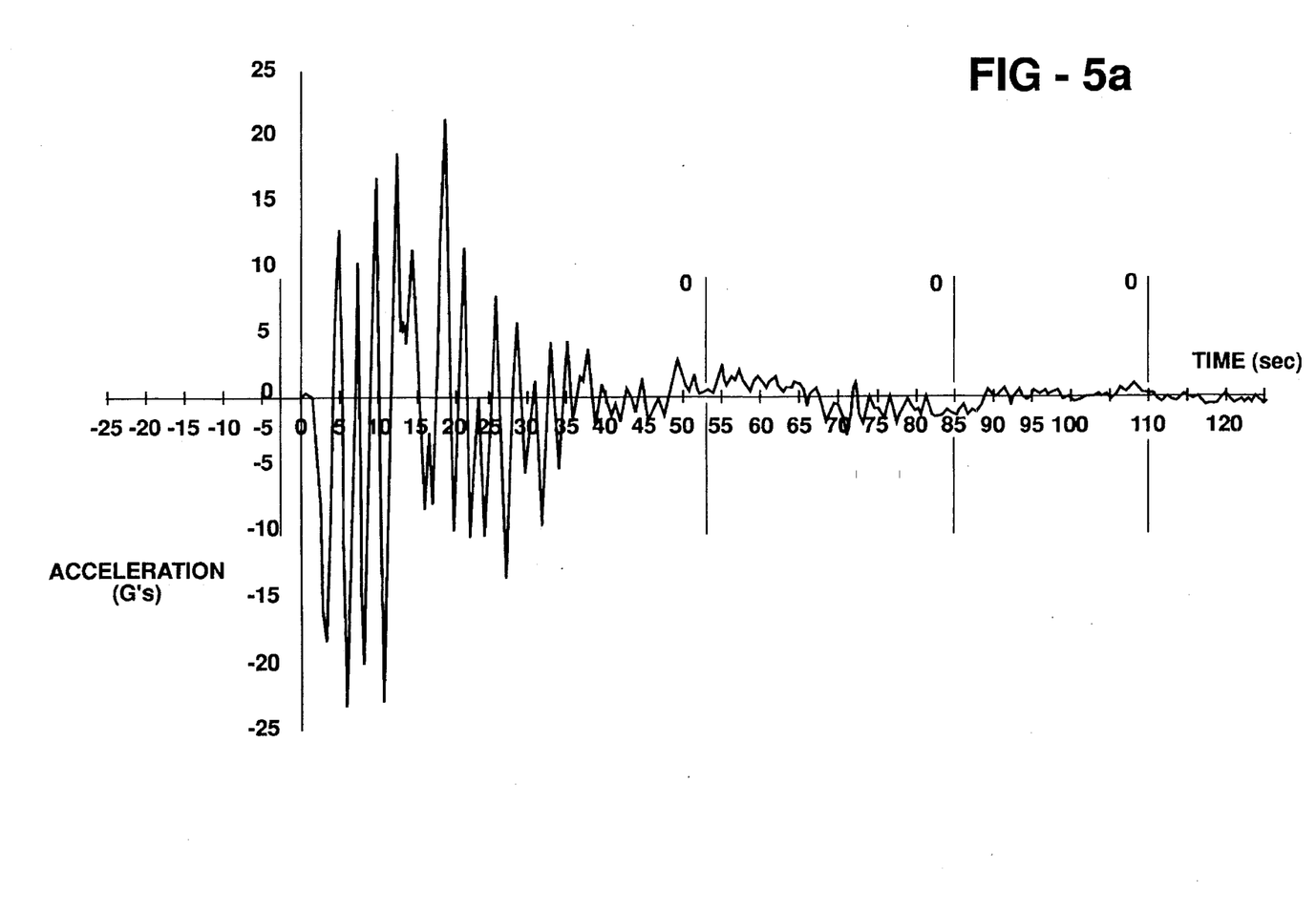
FIGS. 5a and 5b are graphs of acceleration versus time for generating training and test data sets.
Figure 5B:
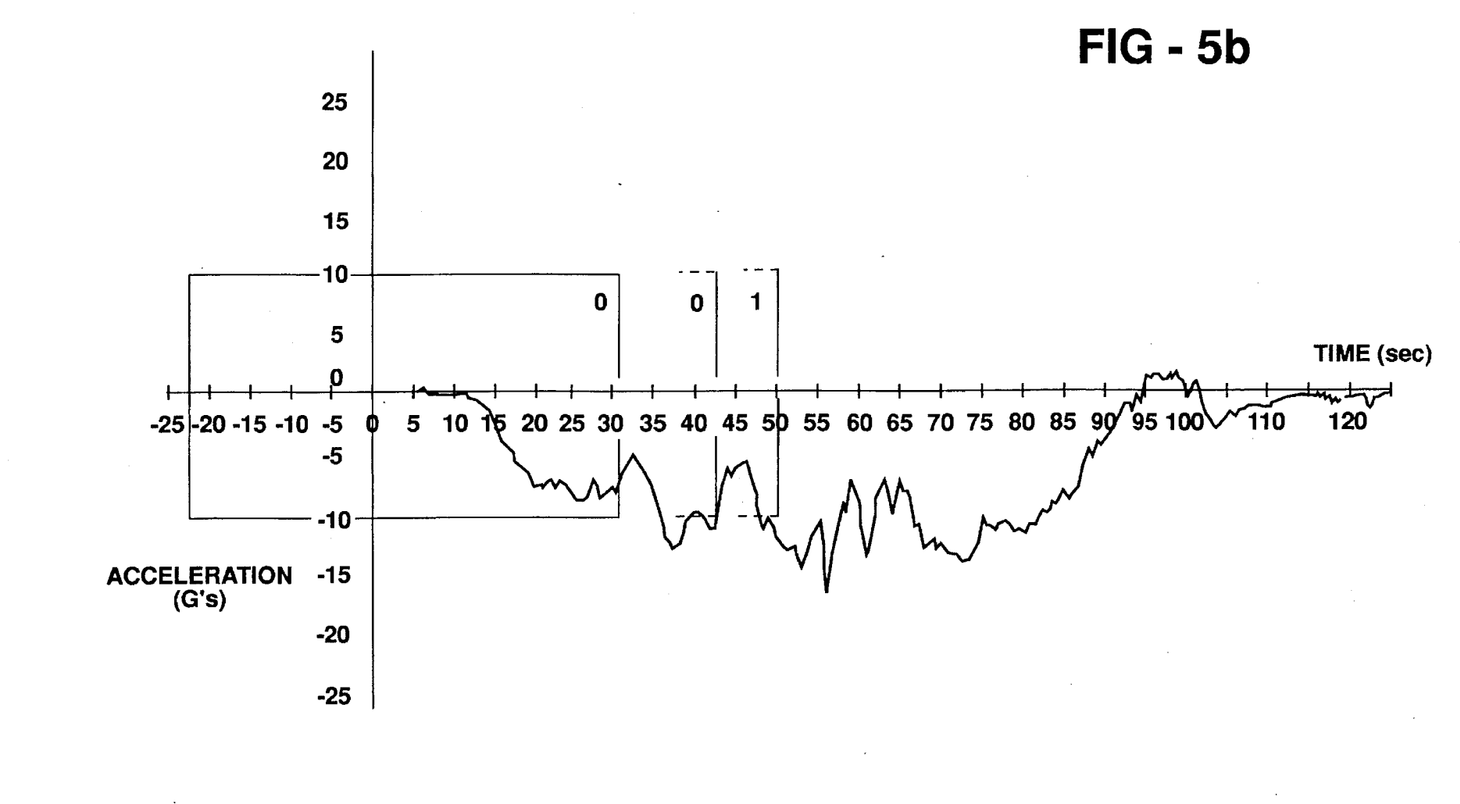

The technique developed for generating training and test sets is described relative to FIGS. 5a and 5b. A data window of a given size (where the window size is a parameter that can be varied) is defined. This window is located at a one or more specific points along a crash signal as it evolves in time, and then the part of the signal that lies within the window is sampled at I ms intervals where $\tau \leq 1.0$ ms. Any part of the window that extends back in time prior to the start of the recorded crash signal is filled with random values. The sampled values extracted from a specific window form the vector of input values needed to define one input/desired output pair in the training or test set.

The vector of desired output values is defined on the basis of where the end of the window lies. If the data window ends before the required deployment time, the output vector is set equal to the single number 0 (which represents "do not deploy the airbag"). If the window ends very close to the required deployment time, the output vector is set equal to the single number 1 (which indicates "deploy the airbag"). If there is no required deployment time associated with a particular signal (i.e., the signal represents a non-deployment event), the output vectors associated with all windows of data extracted from that signal are set equal to 0.

Different sets of data windows can be used to train different neural networks. The way in which any specific training set is assembled is described at the appropriate point in the discussion that follows below.

The test set is constructed in the same way. In particular, input vectors are extracted from a sequence of windows for each signal in a library of crash data empirically collected from various crash tests. Each of the associated output vectors is set equal to 0 or 1 as described above. The test set therefore simulates the situation that would occur if this system were installed in a vehicle, and the neural network was constantly making a "deploy the airbag/do not deploy the airbag" decision based on the most recent window of data provided by an accelerometer.

Design, Train, And Test An SIR Neural Network

A neural network intended for eventual use in a production SIR system as described below satisfies all formal SIR system requirements. It is capable of recognizing single-vehicle and vehicle-to-vehicle crashes that occur over a wide range of velocities in order to deploy the airbag in a timely manner, and it accurately recognizes situations that do not require airbag deployment as well in order to give the system a very high immunity to unwanted deployments. In addition, it is insensitive to minor changes in the structure of the vehicle.

The network architecture is preferably a three-layer network. The number of PEs in the input layer is a function of the selected window size and the value of $\tau$. The number of PEs in the hidden layer is a function of the complexity of the training data and is found by trial-and-error. 1 PE is placed in the output layer.

The network is trained to handle crash signals stored in a data library. An initial training set is defined which consists of only two training vectors; one representing random road noise (a non-deployment event), and one representing the deployment event in the particular data library being used that has the earliest required deployment time. The network is trained using a learning algorithm such as the backpropagation learning algorithm, until it converges, and it is tested on all of the events in the data library. Two additional training vectors are then defined which represent (a) the deployment event for which the maximum neural network output prior to the required deployment time is less than a specified threshold $T_1$ by the greatest amount, and (b) the non-deployment event for which the maximum neural network output exceeds a specified threshold $T_2<T_1$ by the greatest amount. These two new training vectors are added to the training set, and training continues until the network converges again. This train-test-update cycle is repeated until the network's performance is acceptable.

Functional Flow Illustrating Neural Network Software

Figure 6:
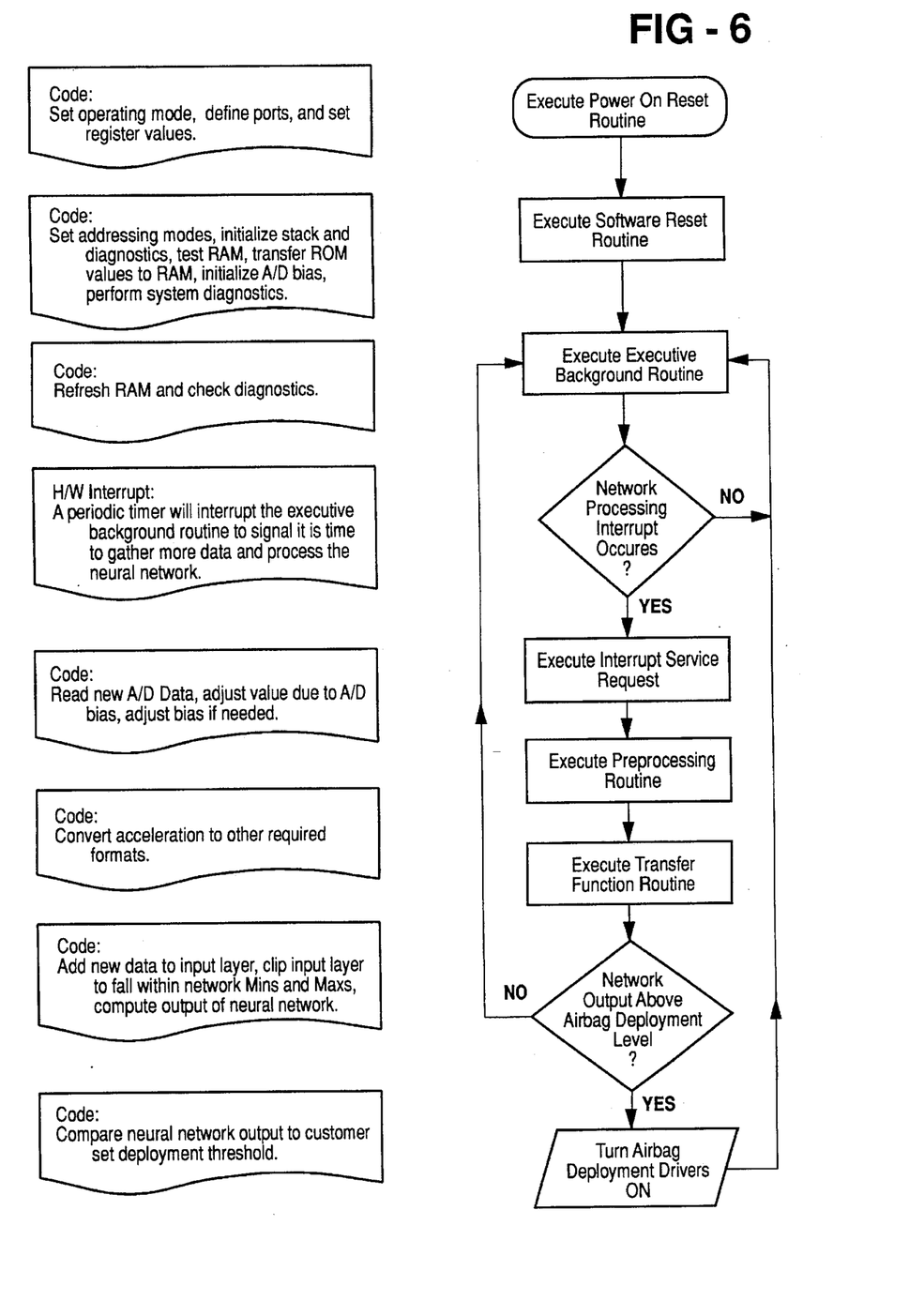
FIG. 6 is a functional block diagram flow chart of neural network software of the present invention.

FIG. 6 illustrates the functional flow of Neural Network Supplemental Inflatable Restraint Software (NNSIR). The program starts by executing a power on reset routine. This procedure configures the microprocessors, ports, timers, register values, and other hardware aspects of the system. A software reset routine is then executed to set addressing modes, stack and diagnostic initialization, and all other software aspects of the operating system. After execution of these two routines, the system is ready for operation.

Figure 7:
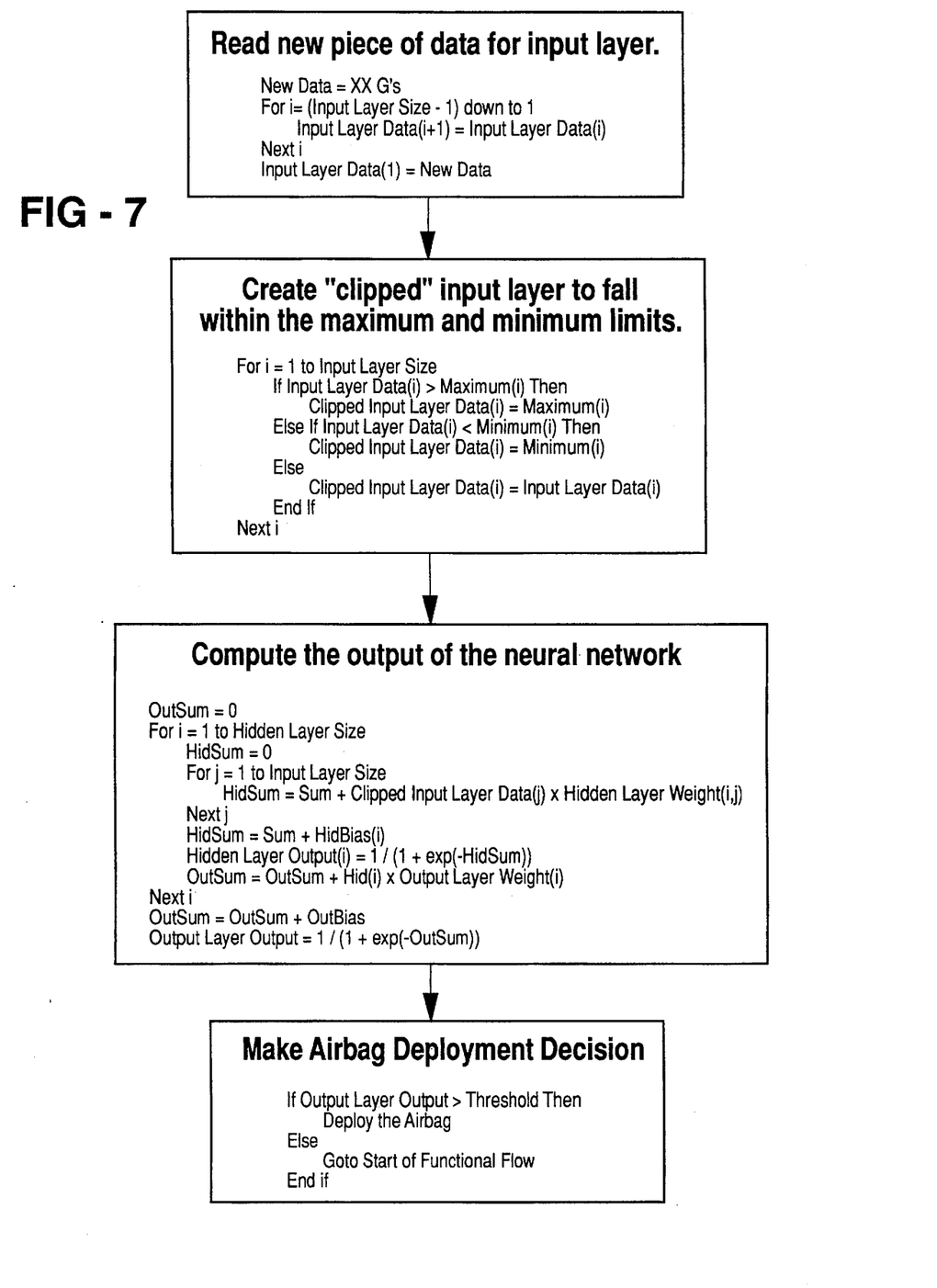
FIG. 7 is a functional block diagram flow chart illustrating a transfer function routine of the software in a pseudo high level language.

The NNSIR system executes the executive background routine, which consists of refreshing the RAM and checking diagnostics, while waiting to be interrupted. When the timer for the data collection rate expires, a hardware interrupt is issued and control of the system passes to the interrupt service request routine. This code reads in the new acceleration data. Control is then passed to the preprocessing routine where, if required, the acceleration signal is preprocessed into another form before being passed to the routine that computes the neural network, the transfer function routine. FIG. 7 details the transfer function routine. FIG. 7 describes this part of the NNSIR software in a pseudo high level language for better understanding.

Neural network processing is started by copying new data into the input layer. Since the input layer's size is constant, the oldest piece of data is dropped. Because during the training process of the neural network a minimum and maximum for each input layer neurode is defined, a copy of the input layer is created with its entries "clipped" as required.

The output of each neurode is computed in the traditional manner. Each hidden layer neurode computes the sum of products between the clipped input layer and the hidden layer neurode's weights. A bias is added and this total sum is applied to a non-linear transfer function to generate the output for the hidden layer neurodes. The actual equations are described hereinbelow. The output layer is computed in the same manner using the outputs from the hidden layer neurodes for its inputs.

To determine if the airbag is to deploy, the data from the output layer is compared to a defined threshold. If the data from the output layer does not exceed the threshold, control of the microprocessor is returned to the executive background routine. If the output exceeds the threshold, the microprocessor turns on the airbag deployment circuitry, which deploys the airbag, before returning control to the executive background routine.

Neural Network Software Algorithm

The algorithm below assumes a single type of input, acceleration, is used in the neural network. As previously stated, derivatives of acceleration may be used in order to achieve customer requirements. The equations that follow also apply for other input types; only the scaling factors would change.

Variables and Constants

The following is a list of terms used in the equations to obtain the deployment decision.

L=Number of layers in the network.
n=Layer number.
$N_n$=Number of neurodes in layer n.
$I_i(n)$=Sum of products (input) to neurode i in layer n.
$\Omega_i(n)$=Output of neurode i in layer n.
$w_{ij}(n,n+1)$=Synapse matrix connecting layers n and (n+1) indexed to neurode i in layer (n+1) and neurode j in layer n.
$\beta_i(n)$=Bias term for neurode i in layer n.
$A^{(n)}()$=Activation function for layer n.

Network Equations

The neural network algorithm is defined by the following formulas:

$$I_i(n+1) = \sum_{j=0}^{N_n-1} w_{ij}(n,n+1)\Omega_j(n) + \beta_i(n) \quad (1)$$

$$\Omega_j(n) = A^{(n)}(I_j(n))$$

where: n=0,1, . . . ,L
i=0,1, . . . ,$(N_{n+1}-1)$

The top equation performs a dot product of the weights from layer 'n+1' with output from layer 'n'. For example, the top equation could be for finding the sum of products of a neurode by applying output data from an input layer to the weights of a hidden layer neurode in a neural network.

The lower part of Equation (1) applies a transfer (or "activation") function (generally a non-linear function) to the sum of products generated by the top part of the equation.

Layer 0 Definition, Layer 1 Input

For layer 0 (the network input level) we have:

$\Omega_i(0) = s_i$ (Sensor input in units used in the Training Process)

$w_{ij}(0,1) = \delta_{ij}$ (Kronecker's delta)

$\beta_i(0) = 0$

Feeding these definitions into Equation (1) results in defining the accelerometer input. In terms of Equation (1):

$$I_i^{(1)} = s_i$$

Scaling of Parameters

Since the neural network uses raw acceleration data in its computation, A/D counts must be transformed back into proper units. In the controller context, $s_i$ is signed accelerometer data read by an A/D converter. The A/D output counts are defined by:

$$C_i = gs_i + b \quad (2)$$

where g is the converter gain (constrained to be a power of 2 for ease of calculations) and b is a biasing constant that forces positive values of $C_i$. The variable $C_{max}$ in Equation (3) is selected to maximize the precision of acceleration data, while taking into account accelerometer clipping. This leads to a gain equation that must satisfy the following inequality:

$$g = 2\gamma \geq C_{max}/S_{max} \quad (3)$$

$C_{max}$ = Maximum absolute A/D count
$S_{max}$ = Maximum absolute acceleration |S|

The A/D count, which is a positive integer, must be transformed into the proper units and framed in an input buffer of the microprocessor. It is desirable to frame the counts such that the maximum precision is obtained. In general, this is modeled by:

$$X_i = (C_i - b)/f = gs_i/f \cdot \Delta \leq x_i < \Delta \quad (4)$$

where $x_i$ is the acceleration input to the microprocessor and f is a power of 2 that forces the limiting bound on $x_i$. $\Delta$ and $-\Delta$ represent the maximum and minimum number that can be represented in the microprocessor. The optimum value of 'f' in this application is defined such that the data is framed in the most significant bits of the input buffer word. This is determined by the data format.

Input Buffer Management

The network input buffer is a sequence of acceleration data ($x_i$) indexed in order of decreasing time, i.e., the value $x_0$ is the oldest input in the buffer and $x_{N-1}$ is the latest sample. With each data word acquisition, the buffer is left shifted one bin; the new value is shifted into the input buffer from the right and the oldest data word is spilled out of the buffer on the left and lost. In practice, this is mechanized as a circular buffer.

Activation Function For Layer 1

In this application, there is an activation function parameterized by bin index; effectively there are $N_1$ activation functions defined in Equation (5).

$$A^{(1)}(S_i) = (\overline{S}_i - \mu_i)/(M_i - \mu_i) = \Omega_i^{(1)} \quad (5)$$

$$S_i = \begin{cases} S_i & \mu_i \leq S_i \leq M_i \\ M_i & S_i > M_i \\ \mu_i & S_i < \mu_i \end{cases} \quad (6)$$

$M_i$ = Maximum allowed value for sensor input to neurode i in layer 1

$\mu_i$ = Minimum allowed value for sensor input to neurode i in layer 1.

The outputs are positive indefinite by virtue of their definition and are bounded in the closed interval [0,1]. It is necessary to express the outputs in the "x" language to maximize the precision possible for the microprocessor arithmetic. This is accomplished with the crossover Equation (4) which, when substituted into Equations (5) and (6), yield:

$$\Omega_i^{(1)} = [f(\overline{X}_i - \overline{\mu}_i)]/[g(M_i - \mu_i)] \quad (7)$$

$$X_i = \begin{cases} X_i & \mu_i \leq X_i \leq M_i \\ M_i & X_i > M_i \\ \mu_i & X_i < \mu_i \end{cases} \quad (8)$$

$\overline{\mu}_i = g\mu_i/f$ $$\overline{M}_i = gM_i/f \quad (9)$$

In the software implementation Equations (9) are stored as two tables to decrease the throughput rate for the determination of Equation (8).

Input To Layer 2

It is observed that the entities $M_i$, $X_i$, $\beta_i(1)$, and $w_{ij}(1,2)$ are determined in the training process. No limitation is placed on them during training; thus, a scaling factor must be added to make the microprocessor arithmetic possible. The related RAM variables are defined in this section. To this end two auxiliary functions are introduced in order to minimize the microprocessor throughput rate and satisfy the microprocessor value constraints; these are $$\omega_{ij}(1,2) = w_{ij}(1,2)/[\sigma_1 (M_j - \mu_j)] \quad (10)$$

$$\beta_i(1) = (g/(f\sigma_1)) \beta_i(1) - \sum_{j=0}^{N_1-1} \omega_{ij}(1,2)\mu_j$$

A new scaling constant, $\sigma_1$, has been introduced. This is a power of 2 chosen such the weights and the biases ($\overline{\omega}$ and $\overline{\beta}$) in the left hand side of Equation (10) are within the boundaries of the microprocessors arithmetic.

Now if one substitutes Equation (7) into Equation (1) and employs Equations (10), there results, after some straight forward algebra, the desired expression for the input to Layer 2:

$$I_i(2) = (f\sigma_1)/g \left( \sum_{j=0}^{N_1-1} \omega_{ij}(1,2) x_j + \beta_i(1) \right) = (f\sigma_1/g)I_i(2) \quad (11)$$

In terms of the network for the NNSIR system, Equation (11) represents the sum of products of the input layer and the hidden layer weights for each neurode in the hidden layer. In practice, the braced quantity on the right side of Equation (11) is computed in the microprocessor and the leading factor is introduced when the Layer 2 Activation Function is computed as is discussed hereinbelow.

Layer 2 Activation Function

The layer 2 activation function is:

$$A^{(2)}(x) = 1/(1+e^{-x}) \tag{12}$$

This function is computed by table look-up and linear interpolation. A table of 129 values corresponding to arguments in the closed, symmetric, interval [−T,T] is stored in RAM. T is chosen such that for x<−T, A(x) is sensibly 0, and conversely for x>T, A(x) is very nearly 1. Thus, in the notation of Equation (11), one resorts to table interpolation whenever the following inequality is satisfied.

$$-T < (f\sigma_1/g)I_i^{(2)} < T \tag{13}$$

A faster way to check this is to do a single comparison based on the equivalent equation:

$$|I_i^{(2)}| < (g^T)/(f\sigma_1) \tag{14}$$

It should be noted that other transfer functions have also been proven viable, including dual polynomial, single polynomial, and a linear transfer function. The more traditional sigmoid function is being used here.

Layer 3 Input Function

Proceeding analogously with the procedures described above, one arrives at:

$$I_i(3) = \sigma_2 \left| \sum_{j=0}^{N_2-1} \omega_{ij}(2,3)\,\Omega_j(2) + \beta_i(2) \right| = \sigma_2 \bar{I}_i(3) \tag{15}$$

Variables $\beta_i(2)$, and $w_{ij}(2,3)$ are derived in the training procedure and $\sigma_2$ is a scale factor that is chosen to force all variables in the left side of Equations (16) to lie within the microprocessors arithmetic range.

Layer 3 Activation Function

There is a single neurode in Layer 3. The activation function for layer 3 is identical with that for layer 2.

$$A^{(3)} = A^{(2)} \tag{17}$$

As described above, the table interpolation technique is executed only if the following condition is met:

$$|\bar{I}_i^{(3)}| < T/\sigma_2 \tag{18}$$

SUMMARY

The method and apparatus of the present invention have numerous benefits. The described SIR system is more robust, more immune to unwanted deployments, and less expensive to develop and update. Fewer crash tests may have to be conducted to collect the data needed for calibration. In addition, a neural network SIR system trained on one set of crash data performed extremely well when tested on other sets of crash data, while meeting federally-mandated requirements. Finally, the method and apparatus illustrate that a practical SIR neural network can be implemented in software and still operate in real time.

An SIR system based on neural network technology may have other advantages as well. As new crash data is obtained, for example, an entirely new neural network can be trained and then used as a field replacement for existing systems. This is far better than continuously "patching" software to account for new crash data. An SIR neural network can also be implemented in hardware, eliminating the SIR "deploy/do not deploy" software completely and increasing throughput speed significantly.

While the best mode for carrying out the invention has been described in detail, those familiar with the art to which this invention relates will recognize various alternative designs and embodiments for practicing the invention as defined by the following claims.

We claim:

1. A method for distinguishing between deployment and non-deployment events from crash signals containing crash data in an SIR system for a motor vehicle, the method comprising the steps of:

generating pairs of training vectors from the crash data, each pair of training vectors including a vector having input values and a vector having a known output value associated with either a deployment event or a non-deployment event;

inputting the pairs of training vectors to a trainable pattern recognition system;

recursively adjusting the pattern recognition system to converge to a configuration of the pattern recognition system to obtain a trained pattern recognition system for matching an input vector with either a deployment event or a non-deployment event;

generating at least one trial input vector from the crash data, the at least one trial input vector corresponding to either a deployment event or a non-deployment event; and inputting the at least one trial input vector to the trained pattern recognition system to generate an output signal representation of one of the events corresponding to the input vector.

2. The method of claim 1 wherein the crash data is vehicle acceleration data.

3. The method of claim 1 wherein the crash data is vehicle acceleration data and wherein the step of generating pairs of training vectors includes the step of converting the acceleration data to another format.

4. The method as claimed in claim 1 wherein the pattern recognition system includes a microprocessor programmed to perform a neural network simulation.

5. The method as claimed in claim 1 wherein the pattern recognition system includes dedicated hardware to perform pattern recognition.

6. The method as claimed in claim 1 wherein the pattern recognition system includes a microprocessor programmed to perform a back-propagation analysis.

7. The method as claimed in claim 1 wherein the trained pattern recognition system includes a neural network having an input layer, a hidden layer and an output layer.

8. The method as claimed in claim 7 wherein the input layer includes a plurality of neurodes and wherein the method further comprises the step of identifying a range defined by a minimum and a maximum for each of the neurodes.

9. The method as claimed in claim 8 wherein the step of recursively adjusting includes the step of adding new data to the input layer and clipping each of the neurodes of the input layer to fall within their respective ranges to obtain a clipped input layer.

10. The method as claimed in claim 1 wherein the step of generating pairs of training vectors includes the step of sampling the crash data at a sampling rate to obtain sampled crash data.

11. Apparatus for distinguishing between deployment and non-deployment events from crash data in an SIR system for a motor vehicle, the apparatus comprising:

means for generating pairs of training vectors from the crash data, each pair of training vectors including a vector having input values and a vector having a known output value associated with either a deployment event or a non-deployment event; and a pattern recognition system for receiving the pairs of training vectors and for recursively adjusting to a configuration of the pattern recognition system to obtain a trained pattern recognition system for matching an input vector with either a deployment event or a non-deployment event; the generating means also generating at least one trial input vector from the crash data, the at least one trial input vector corresponding to either a deployment event or a non-deployment event; the at least one trial input vector being received by the trained pattern recognition system to generate an output signal representation of one of the events corresponding to the input vector.

12. The apparatus as claimed in claim 11 wherein the crash data is vehicle acceleration data.

13. The apparatus as claimed in claim 11 wherein the crash data is vehicle acceleration data and wherein the generating means includes converting means for converting the acceleration data to another format.

14. The apparatus as claimed in claim 11 wherein the pattern recognition system includes a microcomputer programmed to perform a neural network simulation.

15. The apparatus as claimed in claim 11 wherein the pattern recognition system includes hardware dedicated to performing pattern recognition.

16. The apparatus as claimed in claim 11 wherein the pattern recognition system includes a microprocessor programmed to perform a back-propagation analysis.

17. The apparatus as claimed in claim 11 wherein the trained pattern recognition system includes a neural network having an input layer, a hidden layer and an output layer.

18. The apparatus as claimed in claim 17 wherein the input layer includes a plurality of neurodes and wherein the apparatus further comprises means for identifying a range defined by a minimum and a maximum for each of the neurodes.

19. The apparatus as claimed in claim 18 wherein the trained pattern recognition system includes means for adding new data to the input layer and means for clipping each of the neurodes of the input layer to fall within their respective ranges to obtain a clipped input layer.

20. The apparatus as claimed in claim 11 wherein the generating means includes sampling means for sampling the crash data at a sampling rate to obtain sample crash data.

* * * * *